United States Patent

Martinez Taylor

[11] Patent Number: 5,336,876
[45] Date of Patent: Aug. 9, 1994

[54] HIGH-SPEED, GRAVITY-FED DOCUMENT FEEDER FOR BAR-CODE SCANNER

[75] Inventor: Roberto E. Martinez Taylor, Buenos Aires, Argentina

[73] Assignee: Compudata SA, La Plata, Argentina

[21] Appl. No.: 938,299

[22] Filed: Aug. 28, 1992

Related U.S. Application Data

[63] Continuation-in-part of Ser. No. 529,892, May 29, 1990.

[30] Foreign Application Priority Data

Nov. 20, 1989 [AR] Argentina ............................ 315232
May 5, 1992 [AR] Argentina ............................ 322275

[51] Int. Cl.$^5$ ...................... G06K 13/00; B65H 5/22; B65H 83/00; B65H 85/00
[52] U.S. Cl. ........................................ 235/475; 271/3
[58] Field of Search ............... 235/470, 475, 479, 483, 235/484, 485; 271/3, 4, 225

[56] References Cited

U.S. PATENT DOCUMENTS 4,474,365 10/1984 DiBlasio ............................ 271/3
4,962,623 10/1990 Francisco ............................ 53/54

Primary Examiner—Donald Hajec
Assistant Examiner—T. N. Forbus, Jr.
Attorney, Agent, or Firm—Herbert Dubno

[57] ABSTRACT

Sheets carrying bar codes are first stacked with their bar codes directed downward, then are pulled one at a time from the bottom of the stack, and then the pulled sheets are gripped and impelled into an upper upstream end of a guide whose downstream end opens into an outfeed hopper. The sheets slide in free fall downward in the guide in an upstream-to-downstream travel direction along a travel path without being gripped with the sheets passing over a basically planar upstream guide plate having, relative to the travel direction, an upstream edge and a downstream edge below the upstream edge and over a basically planar downstream glide plate having an upstream edge joined to the downstream edge of the upstream plate and a downstream edge below the upstream edge of the downstream plate. The downstream plate lies in a plane forming with the upstream plate an angle of slightly less than 180° while forming with the horizontal an angle of between 17° and 30° so as to deflect the sheets somewhat upward with the downstream plate. The sheets are scanned as they slide downward over the guide plates to read the bar codes thereon, and they are intercepted in the outfeed hopper with an upright end wall having an upper edge lying above the plane of the downstream feed plate so that the sheets come to rest in the output hopper.

8 Claims, 2 Drawing Sheets

HIGH-SPEED, GRAVITY-FED DOCUMENT FEEDER FOR BAR-CODE SCANNER

CROSS REFERENCE TO RELATED APPLICATIONS

This application is a continuation-in-part of copending U.S. patent application Ser. No. 07/529,892 filed May 28, 1990 with a claim to the priority of Argentinean application 314,232 filed Nov. 20, 1989. This application relies also on the priority of Argentinean application 322,275 filed May 5, 1992.

FIELD OF THE INVENTION

The present invention relates to a bar-code reader or scanner. More particularly this invention concerns a high-speed document feeder for such an apparatus.

BACKGROUND OF THE INVENTION

As is known, documents such as tags of differing nature and purposes may incorporate one or more readable codes in one or more rows in such a way that the code may be read by a data acquisition device linked to a computer, a printer, or the like without having to be read one by one by the operator, a procedure which is generally slower and error prone because such work is extremely tedious. Such a device is described in U.S. Pat. No. 4,988,853 of Nagashima. Another high-speed document-handling device is described in U.S. Pat. No. 4,962,623 of Francisco and U.S. Pat. No. 4,844,436 of Jaton.

Documents which should be so read are well known: bank checks coded with magnetic characters, perforated cards, and the like. Nevertheless, the must economical coding is by printing the codes as bar codes for which there are several standards. Bar codes are quite simple and compatible with tolerances admissible for the most common printing procedures. For these reasons, bar codes are widely used for the coding of information on goods for mass sale either by directly printing the bars on the containers or packaging or by the use of adhesive labels adhered on the goods. They are even used now for the coding of airline tickets.

If it were possible to read bar-coded documents, i.e. a printed sheet, by means of devices or machines capable of translating automatically and at great speed the information contained in the bar codes, this kind of documentation would be more extensively used, displacing from use in practice the more expensive codings currently employed where the economics of the operation is decisive. To date no machine has been proposed which can rapidly read bar codes off documents at a rate sufficient for many mass-marketing and similar purposes. Speeds in excess of about 400 documents/minute have not been obtainable.

In order to be able to read bar codes on products of mass use, there are reading devices adapted to capture the information from the variety of labels, containers, and the like. Hence their main characteristic is not their reading speed, but rather the positions and formats. Hand held optical readers, (sometimes named "optical pens") and scanners, some of which are capable of reading a single row of bars and ethers which can scan in more than one direction, are used. The latter are usually fixed and the coded article is displaced over the scanner, usually by hand. As to documents such as paper sheets or cardboard tags which convey information, to date there are no known means for reading automatically and at great speed vertical stacks of documents bearing these bar codes. The machines marketed as the Duplo USA NB-100 and Kowa LB130 can indeed pass bar-coded sheets past a reader, but operate at relatively low speeds, with a maximum throughput of about 500sheets/min or speed of 50M/min. The Duplo device uses two sets of feed belts which inherently puts a relatively low top limit on the speed the device can work at. When the Kowa device is driven at a 400 to 500sheets/minute rate it becomes highly failure prone, furthermore the Kowa machine cannot work from a large stack of sheets.

The prior-art devices take hold of each document, retain same against a vertical wall, displace the document on a horizontal path by means of rollers, and force the document to pass in front of a fixed reading head or scanner. These devices can work with these documents in this orientation because the documents are printed on stiff paper or cardstock due to the relative importance of the document, such as a check, airline ticket, selling tag, or the like. Therefore these slips or tags can stand on edge without collapsing. The problem with these vertically oriented documents is that the overall dimensions or area of the document cannot exceed determined dimensions because if it is too big the sheet cannot remain erect and will fold over because of its excessive weight.

Other devices are known, for example from U.S. Pat. No. 4,474,365 of DiBlasio, which can strip individual sheets from a stack of such sheets with the aim of counting them. While such devices work extremely rapidly, as they are invariably employed as bill counters, they are set up so that no scanning of any indicia on the bills is possible, since the bills travel over a very short path and are held virtually at all points along the travel path. Such a device also only works with relatively stiff paper.

OBJECTS OF THE INVENTION

It is therefore an object of the present invention to provide an improved sheet feeder for a bar-code scanner.

Another object is the provision of such an improved sheet feeder for a bar-code scanner which overcomes the above-given disadvantages, that is which can operate at extremely high speed while still ensuring that the individual sheets are positioned such that the scanner can accurately read the codes on them.

Another object is to provide such a sheet feeder which can accurately pass even relatively flimsy sheets under the scanner at very high speed.

A further object is to provide an improved method of feeding bar-coded sheets past a scanner.

SUMMARY OF THE INVENTION

An apparatus for reading bar codes printed on sheets has according to the invention a housing, a supply hopper in the housing adapted to hold a stack of the coded sheets, an outfeed hopper below the supply hopper in the housing, and a guide defining a path in the housing starting at the supply hopper and ending at the outfeed hopper. The guide has a basically planar upstream guide plate having, relative to an upstream-to--downstream direction of travel of the sheets along the path, an upstream edge and a downstream edge below the upstream edge and a basically planar downstream guide plate having an upstream edge joined to the downstream edge of the upstream plate and a downstream edge below the upstream edge of the downstream plate. The downstream plate lies in a plane forming with the upstream plate an angle of slightly less than 180° while forming with the horizontal an angle of between 17° and 30°, preferably 23°. The outfeed hopper has an upright end wall having an upper edge lying above the plane of the downstream feed plate. A stripper in the housing at the supply hopper pulls a lowermost sheet off the stack and feeds it edgewise in the direction to an upstream end of the guide path and a drive in the housing at the upstream end of the guide path grips the sheets as same are received from the stripper means and delivers the sheets in the travel direction edgewise to the upstream guide plate so that the sheets slide along the guide plates, then strike the outfeed hopper wall, and finally come to rest in the outfeed hopper. A deflector plate in the housing above the downstream guide plate and generally parallel thereto, serves an aerodynamic function of enhancing the slip stream the sheets move in. A downstream end plate of the outfeed hopper has an upstream edge that defines the capacity of the outfeed hopper. An optical scanner in the housing directed downward at the guide plates upstream of the upstream edge of the deflector plate reads bar codes on documents as same slide in the direction over the plates.

With this system it is possible to achieve throughput speeds of as many as 900sheets/minute, that is 15sheets/sec. This speed is possible because the sheets are not gripped along their entire travel path; instead they travel most of the way in a free-fall slide, that is only engaging the guide with their back faces and in fact normally floating a tiny bit above this surface on a cushion of air. The surfaces of the guide plates keep the sheets perfectly flat even at the high speed they are traveling at. In fact this system has been found to use a sort of slipstream effect that causes each sheet to follow in the wake or turbulence of the preceding sheet for perfect feeding not only at high speed, but because of the high speed they are traveling at. The instant invention is therefore based on the surprising discovery that it is possible to achieve throughputs about double the best the prior-art had to offer by eliminating any positive holding of the workpieces as they pass along the scan path. In other words the document are no way gripped or held as they are scanned, for this vital instant they are merely moving in their own plane past the scanner in a high-speed controlled manner.

According to another feature of this invention the scanner is carried on a mount movable in the housing toward and away from the guide plates, laterally relative to the guide plates perpendicular to the travel direction, laterally relative to the guide plates parallel to the travel direction, and pivotally relative to the guide plates. Furthermore the device is equipped with an intermediate plate extending from the downstream edge of the downstream guide plate and into the outfeed hopper and forming with the horizontal an angle of between 51° and 57°. Furthermore in accordance with the invention the deflector plate defines with the downstream guide plate a space that decreases in height in the travel direction.

The method according to this invention therefore comprises the step of first stacking the sheets with their bar codes directed downward, then pulling the sheets one at a time from the bottom of the stack, and then gripping the sheets pulled from the stack and impelling them into an upper upstream end of a guide whose downstream end opens into an outfeed hopper. Subsequently the sheets slide in free fall downward in the guide in an upstream-to-downstream travel direction along a travel path without being gripped, and the sheets pass over a basically planar upstream guide plate having, relative to the travel direction, an upstream edge and a downstream edge below the upstream edge and over a basically planar downstream guide plate having an upstream edge joined to the downstream edge of the upstream plate and a downstream edge below the upstream edge of the downstream plate, The downstream plate lies in a plane forming with the upstream plate an angle of slightly less than 180° while forming with the horizontal an angle of between 17° and 30° so as to deflect the sheets somewhat upward with the downstream plate. The sheets are scanned as they slide downward over the guide plates to read the bar codes thereon, and they are intercepted in the outfeed hopper with an upright end wall having an upper edge lying above the plane of the downstream feed plate so that the sheets come to rest face up in the output hopper, that is with the bar codes facing up.

According to the invention the sheets can be oriented in the stack such that their bar codes extend perpendicular or parallel to the travel direction. The scanner has a correspondingly oriented sweep perpendicular to the travel direction. Furthermore according to the invention the sheets are impelled into the upper guide end at a speed of between 0.3M/sec and 1.2M/sec.

BRIEF DESCRIPTION OF THE DRAWING

The above and other objects, features, and advantages will become more readily apparent from the following highly diagrammatic drawing in which.

SPECIFIC DESCRIPTION

Figure 1:
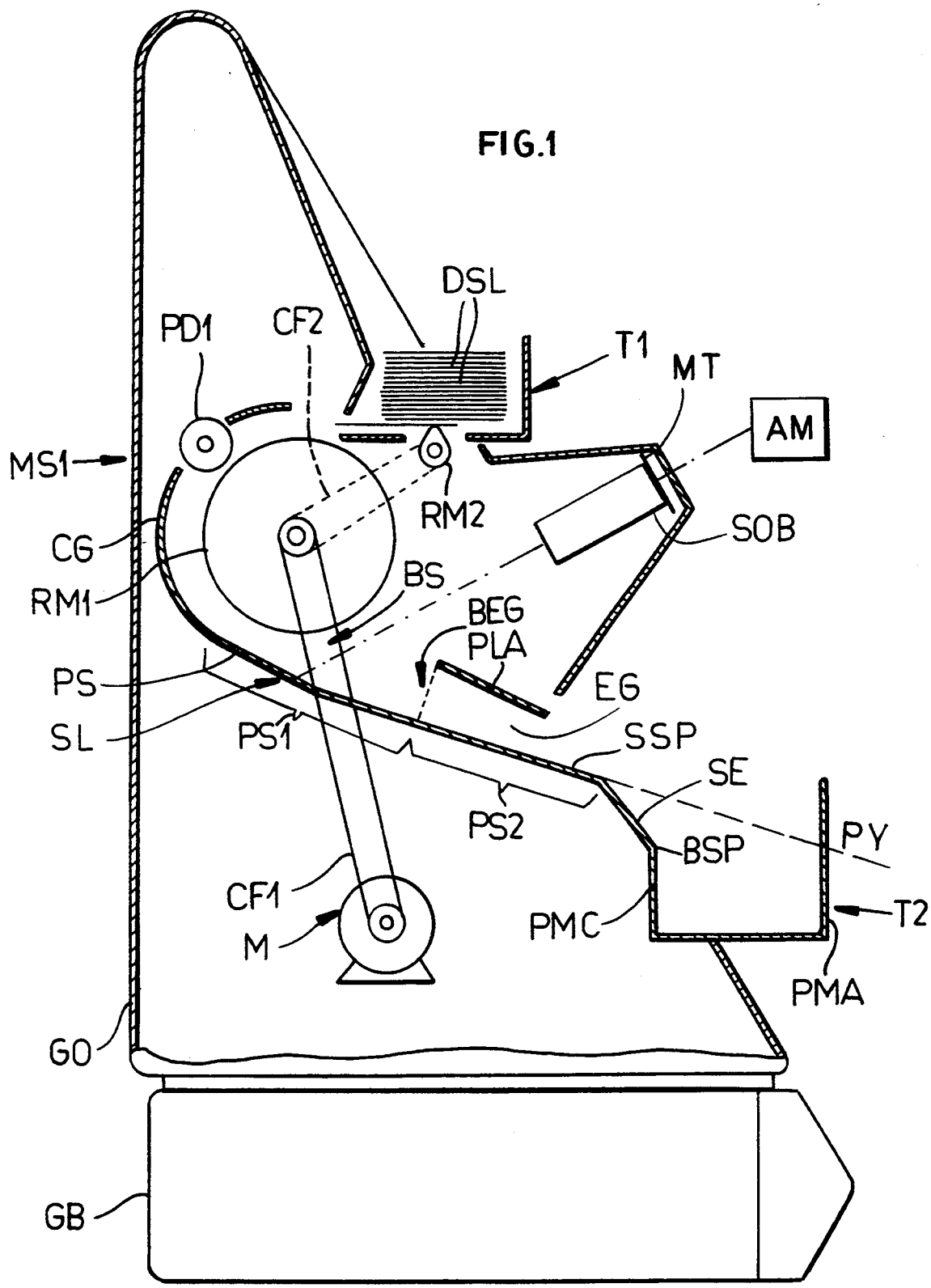
FIG. 1 is a diagrammatic section of a mechanism for the displacement of document in a scanner able to read a bar code, and the other mechanical parts contributing to reading of the document.

FIG. 1 shows a hopper T1 in which documents DSL to be scanned are stacked with their bar codes down. A drive such as a motor M which is electrically operated by a processor PC (FIG. 2), transmits its movement by means of a series of belt CF1 and CF2 to driving rollers RM1 and RM2. The roller RM2 extends through a rectangular opening at the bottom of the hopper T1 and is eccentric in such a way that once during each counterclockwise revolution its eccentric protuberance engages one and only one document at a time from the bottom of the stack DSL and speedily conveys this document to the upstream end of a guide path formed by a curved guide plate CG and the driving roller RM1, which has a furrowed or grooved surface and rotates in direction BS. The displacement of the document is assisted by a document-pressing roller PD1 that projects through a rectangular opening in the guide plate CG. The drive constituted by the rollers PD1 and RM1 displaces the sheets DSL at a speed of between 1.2M/sec and 0.3M/sec, for a delivery rate as high as 900sheets/minute.

The documents or sheets DSL are thus delivered on edge to an upstream guide plate PS whose upper surface SL is substantially planar and over which the document is held and retained by its own weight so that its row or rows of bar codes, which may be parallel or perpendicular to the travel direction, are scanned by a sweeping optical sensor SOB. This scanner SOB, which incorporates an intelligent decoder DEC (FIG. 2) is capable of recognizing not only the bar code, but also under which standard the code is classified. This scanner SOB is mounted on the housing of the device which has a fixed portion GO connected to the body of the device and a movable part MT which holds the optical sensor SOB generating a scanning beam BS. The two parts GO and MT are connected to one another by adjustable means AM (FIG. 1) allowing movements in three directions, namely:

movement perpendicular to the surface SL, which allows the scanner SOB to approach or move away from surface SL;

movement perpendicular to the drawing's plane, (that is parallel to the direction of the row of bar codes); and angular movements in the drawing plane in order to obtain a scanning sweep with different angles in relation to the scanned document which allows optimization of the angle in order to obtain the best possible scanning speeds.

When the document exits the reading surface SL. the document engages a planar downstream guide plate SSP which forms an angle of between 170° and 180° with the plate PS and an angle of between 17° and 30°, preferably 23°±3°, with the horizontal. This slight upward deflection of the document DSL, which has long since been released completely by the rollers PD1 and RM1 and is sliding in free-fall, ensures that even a relatively flimsy sheet will remain flat. Furthermore a plate PLA is positioned above and forms a gap EG with the plate SSP starting in about its middle, at a level BEG. The gap EG narrows in the downstream direction so that it acts aerodynamically to further ensure that the sheets DSL will remain flat on the plate SSP. The plate PLA has an upstream edge that subdivides the upper surfaces of the plates PS and SSP into an upstream surface portion PS1 and a downstream surface portion PS2.

In practice the machine works so rapidly that there is a slipstream effect, with each sheet DSL traveling in the wake of the preceding sheet so that the sheets DSL, even though traveling at the very high rate of as much as 1.2M/sec, remain flat on the surfaces PS1 and PS2.

The downstream plate SSP lies on a plane PY that intersects a vertical downstream wall PMA of an outfeed hopper T2 well below its upper edge so that the sheets DSL will be stopped by this wall PMA and drop into a neat pile on the floor of the basically rectangular hopper T2, between upstream and downstream walls PMC and PMA of this hopper T2. In addition the downstream edge of the downstream plate SSP Joins an upper upstream edge of an intermediate feed plate SE that forms with the horizontal an angle of between 51° and 57° for smoothest transition as the documents DSL are stopped and float down in the hopper T2. The feed plate SE is formed with a downstream edge BSP defining a desirable direction of the float down direction of the documents upon contact thereof with the vertical plate PMA.

A sensor S1 (FIG. 2) in the hopper T1 issues a signal indicating the presence of the documents DSL. The signal can be further used to Stop the movement of the device when no more documents DSL are detected, indicating a paper jam or that the hopper T1 has been emptied. A sensor S2 on the surface SL provides a signal indicative of the presence of a document on same and this information is employed to register the format (shape) of the first scanned document, the following stacked documents DSL having the same format, with predetermined tolerances.

The body or casing GO of the device, originally intended to house the components of a bill-counting machine, is supported by another body GB in which the electronic control board is received together with the alpha-numerical display and a disk storage unit (either a hard or flexible disk).

Further, in other embodiments of the invention, I may have more than one final hopper, one of which collects documents DSL with could not be read, as well as several hoppers for the classification of several kinds of correctly read documents DSL according to the information they contain. To this end, one or more switchable guides are provided for the documents DSL, switching the document paths from one position to others conveying the documents DSL to the appropriate hopper.

Figure 2:
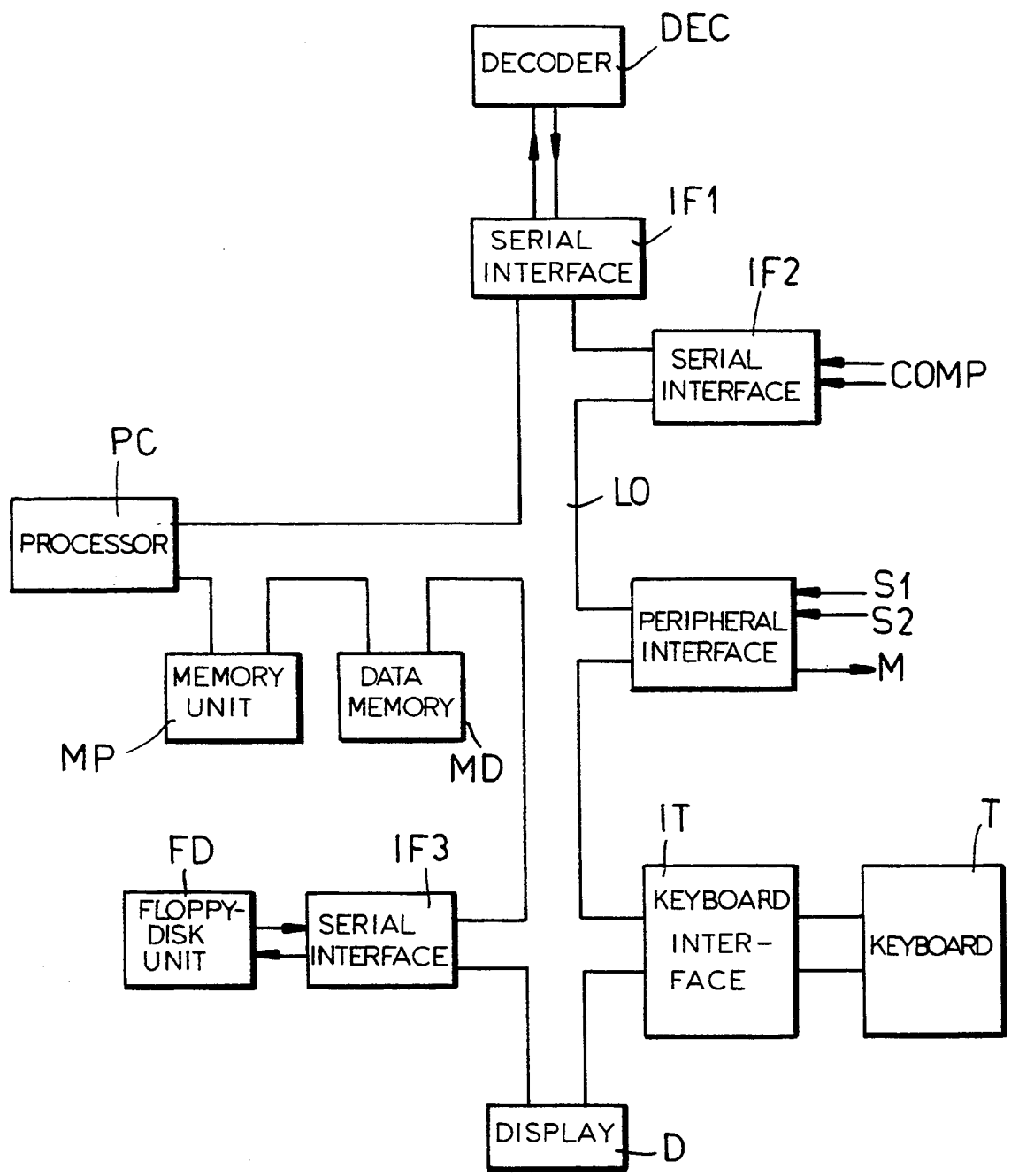
FIG. 2 is a block diagram of the system.

FIG. 2 is a block diagram of the electronic configuration of this invention. In the working prototype of this invention I have used as processor PC a processor chip 6809. This processor PC is connected with its other components through its buses LO including the data acquisition line, the direction line and the control line. MP represents the memory unit, e.g. two Eproms 2716 have been used. MD is the data memory, e.g. a RAM 84256. D is an alpha-numerical display which can be connected without the need of an interface. In other embodiments it may include a suitable interface. The keyboard T is connected through a keyboard interface IT, in this case a controller 8278, to the bus LO. The connections to the motor M and eventually to other actuators, such as brakes and electromagnetic clutches, as well as for the sensors S1, S2 are effected through a peripheral interface PIR with input/output ports, for example a model 8821. Last, for the decoder DEC of the sweeping optical scanner SOB for an external computer COMP and for the flexible disk unit FD, serial interfaces of the RS-232 type, identified in the diagram as IF1, IF2, IF3, employing an integrated circuit 6850 can be used.

It is quite obvious that it is possible to construct in connection with the bus lines LO of the processor PC, other interfaces, such as an interface printer, for a screen, or the like.

The results obtained with the device of this invention fundamentally depend on the programs or software stored in the appropriate memory. I have used several programs, with determined variations enabling this device to work with determined variations enabling this device to work with documents batches, to verify same, to program the scanning of several different dispositions for the rows of printed bar codes, to modify the information to be presented at D, etc.

With the software I have obtained a device for the automatic reading of printed documents DSL with at least one row of bar codes printed thereon; which satisfies the initial objectives for this invention. Thus, the prototype attained speeds of 400 to 900 documents DSL scanned per minute, detecting reading mistakes due to erroneous positioning, superposition, documents DSL not belonging to the selected batch, etc.

The prototype had a body or casing with a height of about 48cm, a width of 39cm and a length of 31cm. The device can read documents DSL measuring from 5cm×10cm up to 10.5cm×21cm printed on paper sheets with thickness ranging from 0.08mm to 0.18mm.

The minimum height of the printed bar code is 12mm, with a minimum bar width of 0.25mm and a maximum code length of 10.2cm.

I CLAIM:

1. An apparatus for reading bar codes printed on sheets, the apparatus comprising:
   a housing;
   a supply hopper in the housing adapted to hold a stack of the coded sheets;
   an outfeed hopper below the supply hopper in the housing;
   a guide defining a path in the housing starting at the supply hopper and ending at the outfeed hopper and having
      a basically planar upstream guide plate having, relative to an upstream-to-downstream direction of travel of the sheets along the path, an upstream edge and a downstream edge below the upstream edge, and
      a basically planar downstream guide plate having an upstream edge joined to the downstream edge of the upstream plate and a downstream edge below the upstream edge of the downstream plate, the downstream plate lying in a plane forming with the upstream plate an angle of slightly less than 180° while forming with the horizontal an angle of between 17° and 30°, the outfeed hopper having an upright end wall having an upper edge projecting above the extending plane of the downstream guide plate;
   stripper means in the housing at the supply hopper for pulling a lowermost sheet off the stack and feeding it edgewise in the direction to an upstream end of the guide path;
   drive means in the housing at the upstream end of the guide path for gripping the sheets an name are received from the stripper means and for delivering the sheets in the travel direction edgewise to the upstream guide plate so that the sheets slide freely and adjacent along the guide plates, then strike the outfeed-hopper wall and come to rest in the outfeed hopper;
   a deflector plate in the housing above the downstream guide plate, generally parallel thereto, and having an upstream edge; and
   means including an optical scanner in the housing directed downward at the guide plates upstream of the upstream edge of the deflector plate for reading bar codes on documents as same slide in the direction over the plates.

2. The code-reading apparatus defined in claim 1 wherein the scanner is carried on a mount movable in the housing toward and away from the guide plates, laterally relative to the guide plates perpendicular to the travel direction., laterally relative to the guide plates parallel to the travel direction, and pivotally relative to the guide plates.

3. The code-reading apparatus defined in claim 1, further comprising
   an intermediate plate extending from the downstream edge of the downstream guide plate and into the outfeed hopper and forming with the horizontal an angle of between 51° and 57°.

4. The code-reading apparatus defined in claim 1 wherein the deflector plate defines with the downstream guide plate a space that decreases in height in the travel direction.

5. A method of reading bar codes printed on sheets, the method comprising the steps of:
   stacking the sheets with their bar codes directed downward;
   pulling the sheets one at a time from the bottom of the stack;
   gripping the sheets pulled from the stack and impelling them into an upper upstream end of a guide whose downstream and opens into an outfeed hopper;
   sliding the sheets downward in the guide in an upstream-to-downstream travel direction along a travel path without gripping the sheets over
   a basically planar upstream guide plate having,
      relative to the travel direction, an upstream edge and a downstream edge below the upstream edge,
   a basically planar downstream guide plate having an upstream edge joined to the downstream edge of the upstream plate and a downstream edge below the upstream edge of the downstream plate, the downstream plate lying in a plane forming with the upstream plate an angle of slightly less than 180° while forming with the horizontal an angle of between 17° and 30° so as to deflect the sheets somewhat upward with the downstream plate;
   scanning the sheets as they slide downward over the guide plates to read the bar codes thereon; and
   intercepting the sheets in the outfeed hopper with an upright end wall having an upper edge lying above the plane of the downstream guide plate so that the sheets come to rest in the output hopper.

6. The code-reading method defined in claim 5, further comprising the step of:
   orienting the sheets in the stack such that their bar codes extend perpendicular to the travel direction, the scanner having a transverse sweep perpendicular to the travel direction.

7. The code-reading method defined in claim 5, further comprising the step of:
   orienting the sheets in the stack such that their bar codes extend parallel to the travel direction, the scanner having a sweep parallel to the travel direction.

8. The code-reading method defined in claim 5 wherein the sheets are impelled into the upper guide end at a speed of between 0.3m/sec and 1.2m/sec.

* * * * *